United States Patent
Kim et al.

(10) Patent No.: US 8,423,609 B2
(45) Date of Patent: Apr. 16, 2013

(54) METHOD AND NETWORK APPARATUS FOR REQUESTING DATA BASED ON CONTENT NAME

(75) Inventors: Jae Hoon Kim, Yongin-si (KR); Byoung Joon Lee, Seongnam-si (KR); Myeong Wuk Jang, Seoul (KR); Ji Hoon Lee, Anyang-si (KR); Joong Hong Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 185 days.

(21) Appl. No.: 12/912,670

(22) Filed: Oct. 26, 2010

(65) Prior Publication Data
US 2011/0161408 A1    Jun. 30, 2011

(30) Foreign Application Priority Data
Dec. 29, 2009    (KR) ........................ 10-2009-0133170

(51) Int. Cl.
*G06F 15/16*    (2006.01)
(52) U.S. Cl.
USPC ............................. 709/203; 709/226; 370/447
(58) Field of Classification Search .................. 709/203, 709/226; 370/447
See application file for complete search history.

(56) References Cited

U.S. PATENT DOCUMENTS

| | | | |
|---|---|---|---|
| 6,909,723 B1 * | 6/2005 | Yonge et al. | 370/447 |
| 2002/0160788 A1 * | 10/2002 | Duffett-Smith et al. | 455/456 |
| 2006/0223461 A1 * | 10/2006 | Laroia et al. | 455/103 |
| 2006/0245425 A1 | 11/2006 | Mathis et al. | |
| 2008/0172506 A1 | 7/2008 | Ellerbrock et al. | |
| 2009/0193114 A1 | 7/2009 | Dick et al. | |

FOREIGN PATENT DOCUMENTS

| | | |
|---|---|---|
| EP | 1915000 A1 | 4/2008 |
| JP | 2008-288978 | 11/2008 |
| JP | 2008-312115 | 12/2008 |
| KR | 10-2003-0019900 | 3/2003 |
| KR | 10-2004-0076660 | 9/2004 |
| KR | 10-2009-0010514 | 1/2009 |

OTHER PUBLICATIONS
International Search Report issued Aug. 31, 2011, in counterpart International Application No. PCT/KR2010/008830 (4 pages).

* cited by examiner

*Primary Examiner* — Yves Dalencourt
(74) *Attorney, Agent, or Firm* — NSIP Law

(57) ABSTRACT

Provided are a network apparatus and system that may request or receive the same contents stored in a plurality of network apparatuses. In a network system sharing data, specific segments from a plurality of segments constituting the data may be received from mutually different terminals. For this, a transmission region may be determined by calculating a transmission offset corresponding to the plurality of terminals, and at least one segment included in the determined transmission region may be received from a corresponding terminal.

25 Claims, 8 Drawing Sheets

FIG. 7

| | | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|---|
| 202 | N1 | 1 | 2 | 3 | 4 | 5 | 6 | 7 | 8 | 9 | 10 | 11 | 12 | 13 | 14 | 15 | 16 | 17 | 18 | 19 | 20 | 21 |
| 203 | N2 | 1 | 2 | 3 | 4 | 5 | 6 | 7 | 8 | 9 | 10 | 11 | 12 | 13 | 14 | 15 | 16 | 17 | 18 | 19 | 20 | 21 |
| 204 | N3 | 1 | 2 | 3 | 4 | 5 | 6 | 7 | 8 | 9 | 10 | 11 | 12 | 13 | 14 | 15 | 16 | 17 | 18 | 19 | 20 | 21 |
| 205 | N4 | 1 | 2 | 3 | 4 | 5 | 6 | 7 | 8 | 9 | 10 | 11 | 12 | 13 | 14 | 15 | 16 | 17 | 18 | 19 | 20 | 21 |

METHOD AND NETWORK APPARATUS FOR REQUESTING DATA BASED ON CONTENT NAME

CROSS-REFERENCE TO RELATED APPLICATION(S)

This application claims the benefit under 35 U.S.C. §119(a) of Korean Patent Application No. 10-2009-0133170, filed on Dec. 29, 2009, in the Korean Intellectual Property Office, the entire disclosure of which is incorporated herein by reference for all purposes.

BACKGROUND

1. Field

The following description relates to a technique for sharing data in a network system based on contents, and more particularly, to a network apparatus and system that may request or receive the same contents stored in a plurality of network apparatuses.

2. Description of Related Art

The currently used Internet includes an end-to-end connection structure based on Internet Protocol (IP). The Internet Protocol (IP) is a protocol used for communicating data across a packet-switched internetwork using the Internet Protocol Suite, also referred to as TCP/IP. In an IP-based Internet structure, a connection between network apparatuses is important and thus, the Internet relies on addresses of the network apparatuses. Two of the most complicated aspects of IP are IP addressing and routing. Addressing refers to how end hosts become assigned IP addresses and how subnetworks of IP host addresses are divided and grouped together. Accordingly, it may be difficult to continuously download contents once the address of one of the network apparatuses is changed. In particular, since the IP-based Internet structure includes a client-server structure, the addresses of the network apparatuses may be retrieved in order to retrieve contents desired to be downloaded.

Moreover, in the client-server structure, both a network apparatus requesting contents and a network apparatus providing contents may detect a server, thus, reliability on the server may increase. In this instance, when a number of network apparatuses connected to the server increases, contents may not be continuously provided. For example, when streaming video, service may be dropped in between buffering periods.

Conventional data transmission technique based on contents do not continuously provide contents regardless of the number of network apparatuses.

SUMMARY

In one general aspect, there is provided a method of requesting data based on a content name, the method including: transmitting a data request message to retrieve data, the data including a plurality of segments, receiving, from a plurality of network apparatuses, at least one segment of the plurality of segments corresponding to the data request message, calculating a transmission offset using at least one of the plurality of network apparatuses transmitting the at least one segment, determining a plurality of transmission regions respectively corresponding to the plurality of network apparatuses, using the calculated transmission offset, transmitting, to a corresponding network apparatus, a message requesting the at least one segment included in the determined plurality of transmission regions, and receiving, from each of the plurality of network apparatuses, the requested message.

The method may further include that: the transmitting of the data request message broadcasts, to the plurality of network apparatuses, a message requesting a first segment of the plurality of segments, and the first segment is used to retrieve information about whether the data is stored in the plurality of network apparatuses.

The method may further include that: the determining determines the plurality of transmission regions in the transmission offset unit, starting from a second segment of the plurality of segments to a final segment of the plurality of segments, and the plurality of transmission regions includes the at least one segment corresponding to each of the plurality of network apparatuses transmitting the first segment.

The method may further include that the calculating adaptively calculates the transmission offset for each of the plurality of network apparatuses transmitting the first segment.

The method may further include that the calculating adaptively calculates the transmission offset based on an amount of the data and a size of the transmission region transmitted to at least one of the plurality of network apparatuses.

The method may further include that the calculating includes: counting a number of the plurality of network apparatuses transmitting the first segment, and calculating the transmission offset based on at least one of: a number of the counted network apparatuses, an amount of the data, a size of each of the plurality of segments, and a link state of each of the plurality of network apparatuses transmitting the first segment.

The method may further include that the transmitting to the corresponding network apparatus multicasts, to the corresponding network apparatuses, a message requesting a start segment included in each of the determined plurality of transmission regions.

In another general aspect, there is provided a network apparatus based on a content name, the network apparatus including: a transceiving unit configured to: transmit a data request message to retrieve data including a plurality of segments, and receive, from a plurality of network apparatuses, at least one segment of the plurality of segments corresponding to the data request message, a calculation unit configured to calculate a transmission offset using at least one of the plurality of network apparatuses transmitting the at least one segment, and a transmission region determining unit configured to determine a plurality of transmission regions respectively corresponding to the plurality of network apparatuses, using the calculated transmission offset, wherein the transceiving unit is further configured to: transmit, to a corresponding network apparatus, the data request message included in the determined plurality of transmission regions, and receive, from each of the plurality of network apparatuses, the at least one segment corresponding to the determined plurality of transmission regions.

The network apparatus may further include that the transceiving unit is further configured to: broadcast, to the plurality of network apparatuses, a message requesting a first segment of the plurality of segments, and use the first segment to retrieve information about whether the data is stored in the plurality of network apparatuses.

The network apparatus may further include that: the transmission region determining unit is further configured to determine the plurality of transmission regions in the transmission offset unit, starting from a second segment of the plurality of segments to a final segment of the plurality of segments, and the plurality of transmission regions includes the at least one segment corresponding to each of the plurality of network apparatuses transmitting the first segment.

The network apparatus may further include that the calculation unit is further configured to adaptively calculate the transmission offset for each of the plurality of network apparatuses transmitting the first segment.

The network apparatus may further include that the calculation unit is further configured to adaptively calculate the transmission offset based on an amount of the data and a size of the transmission region transmitted to at least one of the plurality of network apparatuses.

The network apparatus may further include that the calculation unit is further configured to: count a number of the plurality of network apparatuses transmitting the first segment, and calculate the transmission offset based on at least one of: a number of the counted network apparatuses, an amount of the data, a size of each of the plurality of segments, and a link state of the plurality of network apparatus transmitting the first segment.

The network apparatus may further include that the transceiving unit is further configured to multicast, to a corresponding network apparatus, a message requesting start segments included in each of the determined plurality of transmission regions.

In another general aspect, there is provided a method of requesting data based on a content name, the method including: receiving a data request message requesting data including a plurality of segments, determining, in response to sensing a plurality of network apparatuses in which the data included in the received data request message is stored, the start segment corresponding to each of the sensed plurality of network apparatuses based on an amount of the data and a size of each of the plurality of segments, and transmitting, to each of the sensed plurality of network apparatuses, a message requesting the determined start segment.

The method may further include that the determining of the start segment includes: calculating an average transmission region using an index of the start segment corresponding to each of the sensed plurality of network apparatuses, and adjusting, in response to a difference between the indexes of the start segments corresponding to the sensed plurality of network apparatuses being different from the calculated average transmission region, the start segment corresponding to in response to the difference being different from the average transmission region, wherein the transmitting transmits, to a corresponding network apparatus, the adjusted start segment.

The method may further include that the determining of the start segment randomly determines the start segment corresponding to each of the sensed plurality of network apparatuses, using a ratio between an amount of the data stored in each of the sensed plurality of network apparatuses and a size of each of the plurality of segments.

The method may further include that, in response to initially transmitting the message requesting the start segment to each of the sensed plurality of network apparatuses, the transmitting: inserts information about the size of each of the plurality of segments in the message requesting the start segment, and transmits, to each of the sensed plurality of network apparatuses, the message in which the information is inserted.

In another general aspect, there is provided a network apparatus based on a content name, the network apparatus including: a transceiving unit configured to receive a data request message requesting data including a plurality of segments, and a determination unit configured to determine, in response to sensing a plurality of network apparatuses in which the data is included in the received data request message, a start segment corresponding to each of the sensed plurality of network apparatuses, based on an amount of the data and a size of each of the plurality of segments, wherein the transceiving unit is further configured to transmit, to each of the sensed plurality of network apparatuses, a message requesting the determined start segment.

The network apparatus may further include that the determination unit includes: a calculation unit configured to calculate an average transmission region using an index of the start segment corresponding to each of the sensed plurality of network apparatuses, and an adjustment unit configured to adjust, in response to a difference between the indexes of the start segments corresponding to the sensed plurality of network apparatuses being different from the calculated average transmission region, the start segment corresponding to in response to the difference being different from the average transmission region, wherein the transceiving unit is further configured to transmit, to a corresponding network apparatus, a message requesting the adjusted start segment.

In another general aspect, there is provided a computer-readable storage medium storing a program for implementing a method, including: transmitting a data request message to retrieve data, the data including a plurality of segments, receiving, from a plurality of network apparatuses, at least one segment of the plurality of segments corresponding to the data request message, calculating a transmission offset using at least one of the plurality of network apparatuses transmitting the at least one segment, determining a plurality of transmission regions respectively corresponding to the plurality of network apparatuses, using the calculated transmission offset, transmitting, to a corresponding network apparatus, a message requesting the at least one segment included in the determined plurality of transmission regions, and receiving, from each of the plurality of network apparatuses, the requested message.

The computer-readable storage medium may further include that: the transmitting of the data request message broadcasts, to the plurality of network apparatuses, a message requesting a first segment of the plurality of segments, and the first segment is used to retrieve information about whether the data is stored in the plurality of network apparatuses.

In another general aspect, there is provided a computer-readable storage medium storing a program for implementing a method, including: receiving a data request message requesting data including a plurality of segments, determining, in response to sensing a plurality of network apparatuses in which the data included in the received data request message is stored, the start segment corresponding to each of the sensed plurality of network apparatuses based on an amount of the data and a size of each of the plurality of segments, and transmitting, to each of the sensed plurality of network apparatuses, a message requesting the determined start segment.

Other features and aspects may be apparent from the following description, the drawings, and the claims.

BRIEF DESCRIPTION OF THE DRAWINGS

FIG. 7 is a diagram used for describing an example method of determining a transmission region in a terminal.

Throughout the drawings and the description, unless otherwise described, the same drawing reference numerals should be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the systems, apparatuses, and/or methods described herein may be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, description of well-known functions and constructions may be omitted for increased clarity and conciseness.

Figure 1:
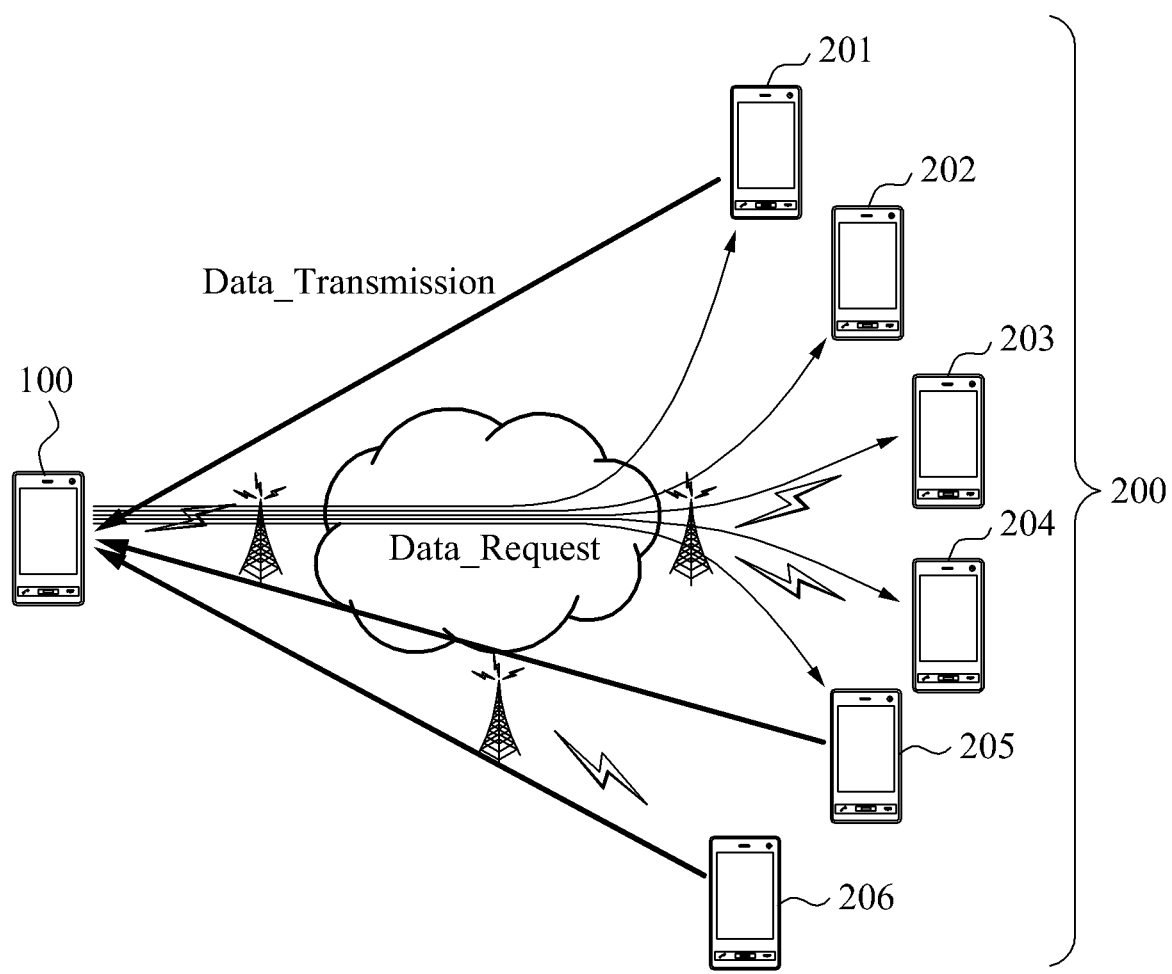
FIG. 1 is a diagram illustrating an example of a network system based on a content name.

FIG. 1 illustrates an example of a network system based on a content name.

Referring to FIG. 1, the network system may include a network apparatus 100 that may request data and a plurality of network apparatuses 200 from which data is shared with the network apparatus 100. Hereinafter, for convenience of description, the network apparatus 100 and each of the plurality of network apparatuses 200 sharing data with the network apparatus 100 may be referred to as a "terminal."

The network apparatus 100 may perform a networking based on a content name that may communicate based on contents with the plurality of terminals 200. In one example, the network apparatus 100 and the plurality of terminals 200 may share data with each other.

In an example of networking based on the content name, the network apparatus 100 may request, from arbitrary terminals among the plurality of terminals 200, data different from an Internet Protocol (IP) address. Next, the network apparatus 100 may receive corresponding data from terminals in which the data requested by the network apparatus 100 is stored, from among the plurality of terminals 200.

For example, the network apparatus 100 may transmit, to the plurality of terminals 200, a data request message. For example, the data request message may include a name of data.

In one example, when an attribute of the data is known when requesting the data, the data request message may further include data attribute information. For example, the data attribute information may include a data format, an amount of data, an author of data, and a date when the data is generated. For example, the data attribute information may be inserted into the data request message as a type of meta-data.

When the networking based on the content name is performed, the network apparatus 100 may receive the requested data regardless of a position of a terminal in which the data is stored.

A technique for reducing the waste of radio resources occurring due to receiving the same data from at least two terminals will be described in detail with reference to FIG. 2.

Figure 2:
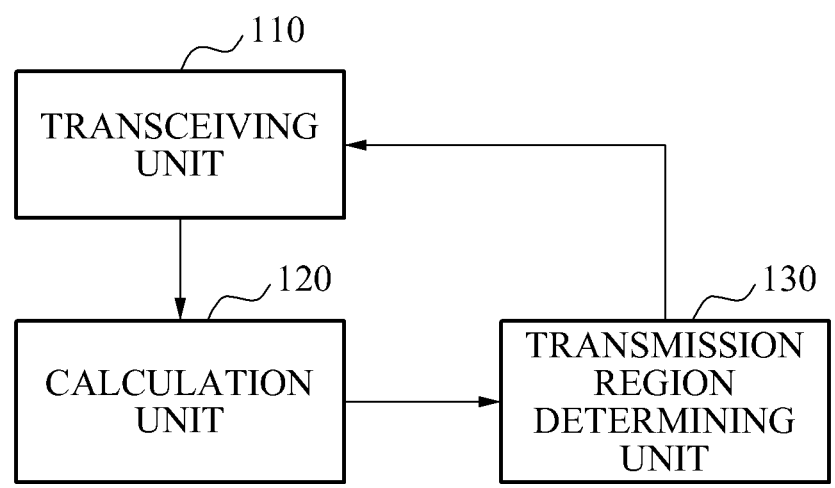
FIG. 2 is a diagram illustrating an example of a configuration of a network apparatus based on a content name.

FIG. 2 illustrates a configuration of an example of a network apparatus 100 based on a content name.

Referring to FIG. 2, the network apparatus 100 may include a transceiving unit 110, a calculation unit 120, and a transmission region determining unit 130.

The network apparatus 100 may broadcast a data request message to a plurality of terminals 200 using the transceiving unit 110. For example, the data request message may be used to retrieve data stored in the plurality of terminals 200.

For example, a first segment from a plurality of segments included in data may be used to retrieve the data stored in the plurality of terminals 200.

Also, the network apparatus 100 may receive the first segment from the plurality of terminals 200 using the transceiving unit 110.

For example, referring to FIG. 1, when requested data is stored in terminals 201 to 205 from a plurality of terminals 201 to 206, the terminals 201 to 205 may transmit, to the network apparatus 100, a first segment corresponding to the requested data. Next, the transceiving unit 110 may receive the first segment from the terminals 201 to 205.

The calculation unit 120 may count a number of the terminals that transmit the first segment. In this instance, the calculation unit 120 may count a number of the terminals 210 to 205 that have transmitted the first segments for which the first segments are received during a predetermined latency time.

The calculation unit 120 may calculate a transmission offset using a number of the counted terminals, an amount of the requested data, a size of a segment included in the requested data, and a link state of each of the counted terminals. For example, the size of the segment may be a number of segments desired to be received from the terminal that requests data.

Figure 3:
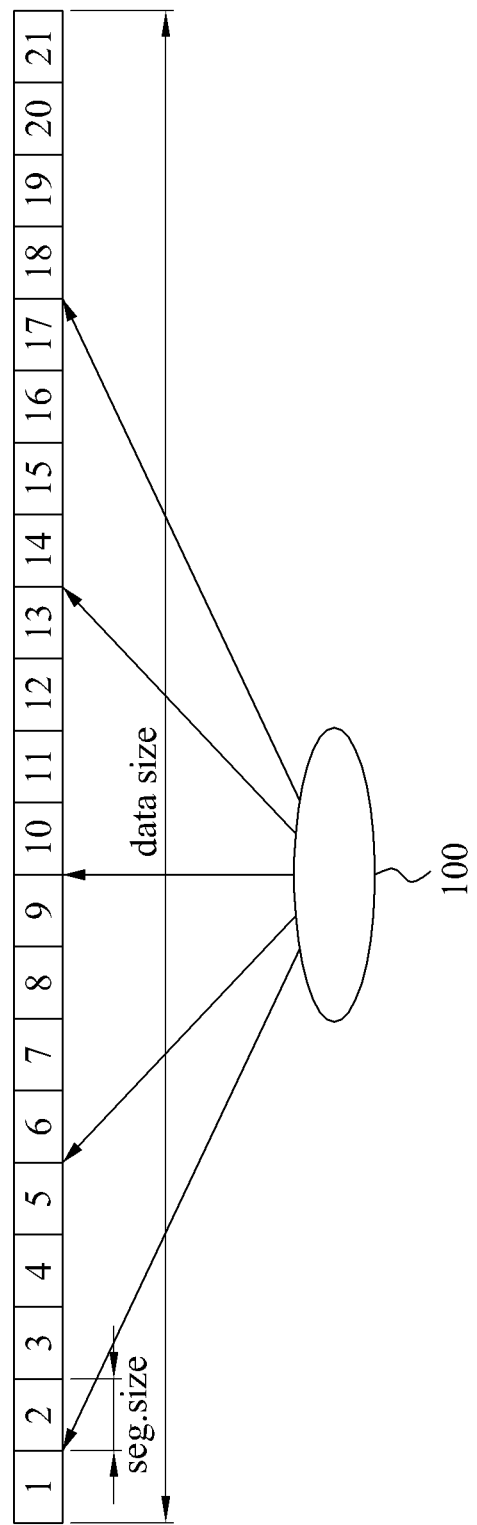
FIGS. 3 and 4 are diagrams used for describing a method of determining a transmission region in a network apparatus.

As an example, as illustrated in FIG. 3, when data includes twenty-one (21) segments, and a first segment is received from five terminals, the calculation unit 120 may remove the first segment from the 21 segments. Next, the calculation unit 120 may divide 20, (e.g., a number of remaining segments) by 5 (e.g., a number of the terminals), obtaining (20/5=) "4" as a transmission offset α.

Next, the transmission region determining unit 130 may determine a transmission region corresponding to each of the counted terminals using the obtained transmission offset.

In one example, the transmission region determining unit 130 may sequentially determine a transmission region for each of the counted terminals based on an order the first segment is received from the counted terminals 201 to 205.

For example, in response to the first segment being received from the terminals 201, 202, 203, 204, and 205 using the transceiving unit 110 in a stated order of the terminals 201 to 205, the transmission region determining unit 130 may sequentially determine the transmission region corresponding to each of the terminals 201 to 205.

In one example, the transmission region determining unit 130 may determine the transmission region corresponding to each of the counted terminals 201 to 205 using a determined transmission region of a previous terminal and the transmission offset.

For example, in an example of the terminal 201, the transmission region determining unit 130 may determine a transmission region of the terminal 201 to enable the same number of segments as the transmission offset to be included in the transmission region, "4" in the above example embodiment, starting from a second segment. For example, as illustrated in FIG. 3, the transmission region of the terminal 201 may include a second segment to a fifth segment. For example, the start segment may be the second segment.

In an example of the terminal 202, a transmission region of the terminal 201 may be determined to include the same number of segments as the transmission offset, "4" in the above example embodiment, starting from the determined start segment of the terminal 201. In one example, the transmission region determining unit 130 may determine a start segment of the terminal 202 as a sixth segment, that is, a value obtained by adding "2" of the start segment of the terminal 201 and "4" of the transmission offset number. For example, as illustrated in FIG. 3, the transmission region of the terminal 202 may include the sixth segment to a ninth segment.

In the same manner, the transmission region determining unit may determine a transmission region of each of the counted terminals 203, 204, and 205.

For example, as illustrated in FIG. 3, the transmission region of the terminal 203 may include a tenth segment to a thirteenth segment, and a start segment of the terminal 203 may be the tenth segment. The transmission region of the terminal 204 may include a fourteenth segment to a seventeenth segment, and a start segment of the terminal 204 may be the fourteenth segment. The transmission region of the terminal 205 may include an eighteenth segment to a twenty-first segment, and a start segment of the terminal 205 may be the eighteenth segment.

Then, the transceiving unit 110 may transmit, to each of the corresponding terminal 201 to 205, a message requesting the start segment included in each of the determined plurality of transmission regions. In one example, the transceiving unit 110 may receive, from each of the terminals 201 to 205, corresponding segments.

For example, the transceiving unit 110 may transmit a message requesting the second segment to the terminal 201, and multicast a message requesting the sixth segment to the terminal 202. In a similar manner, the transceiving unit 110 may multicast, to each of the terminals 203, 204, and 205, a message requesting each of the tenth segment, the fourteenth segment, and the eighteenth segment.

As described above, the transmission region corresponding to each of the terminals 210 to 205 may be determined using the fixed transmission offset, however, the calculation unit 120 may adaptively calculate the transmission offset using a number of the counted terminals, an amount of the requested data, a size of a segment included in the requested data, and a link state of the counted terminals.

In one example, the calculation unit 120 may differentially calculate the transmission offset for each of the counted terminals 210 to 205.

Figure 4:
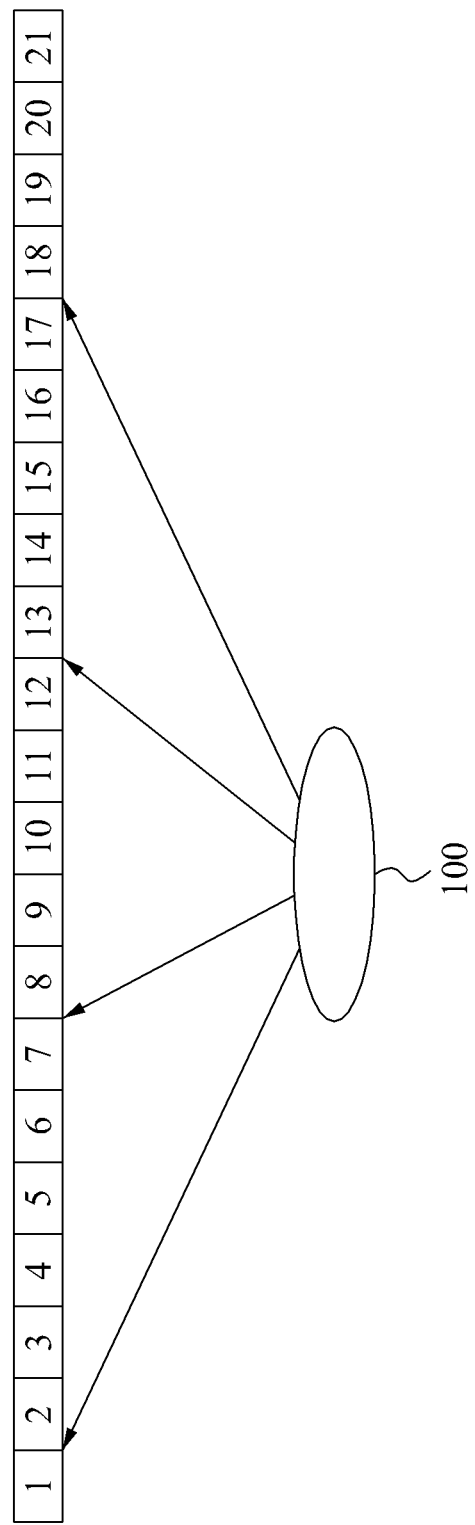

For example, as illustrated in FIG. 4, the calculation unit 120 may calculate the transmission offset of the terminal 201 as "6", and may calculate the transmission offset of the terminal 204 as "4". Similarly, the calculation unit 120 may calculate the transmission offset of each of the terminals 202 and 203 as "5".

Then, the transmission region determining unit 130 may determine the transmission region of the terminal 201 to enable the second segment to a seventh segment to be included in the transmission region of the terminal 201. In the same manner, the transmission region determining unit 130 may determine the transmission region of each of the terminals 202, 203, and 204 to enable the eighth segment to a twelfth segment to be included in the transmission region of the terminal 202. This may enable the thirteenth segment to the seventeenth segment to be included in the transmission region of the terminal 203, and may enable the eighteenth segment to the twenty-first segment to be included in the transmission region of the terminal 204.

Figure 5:
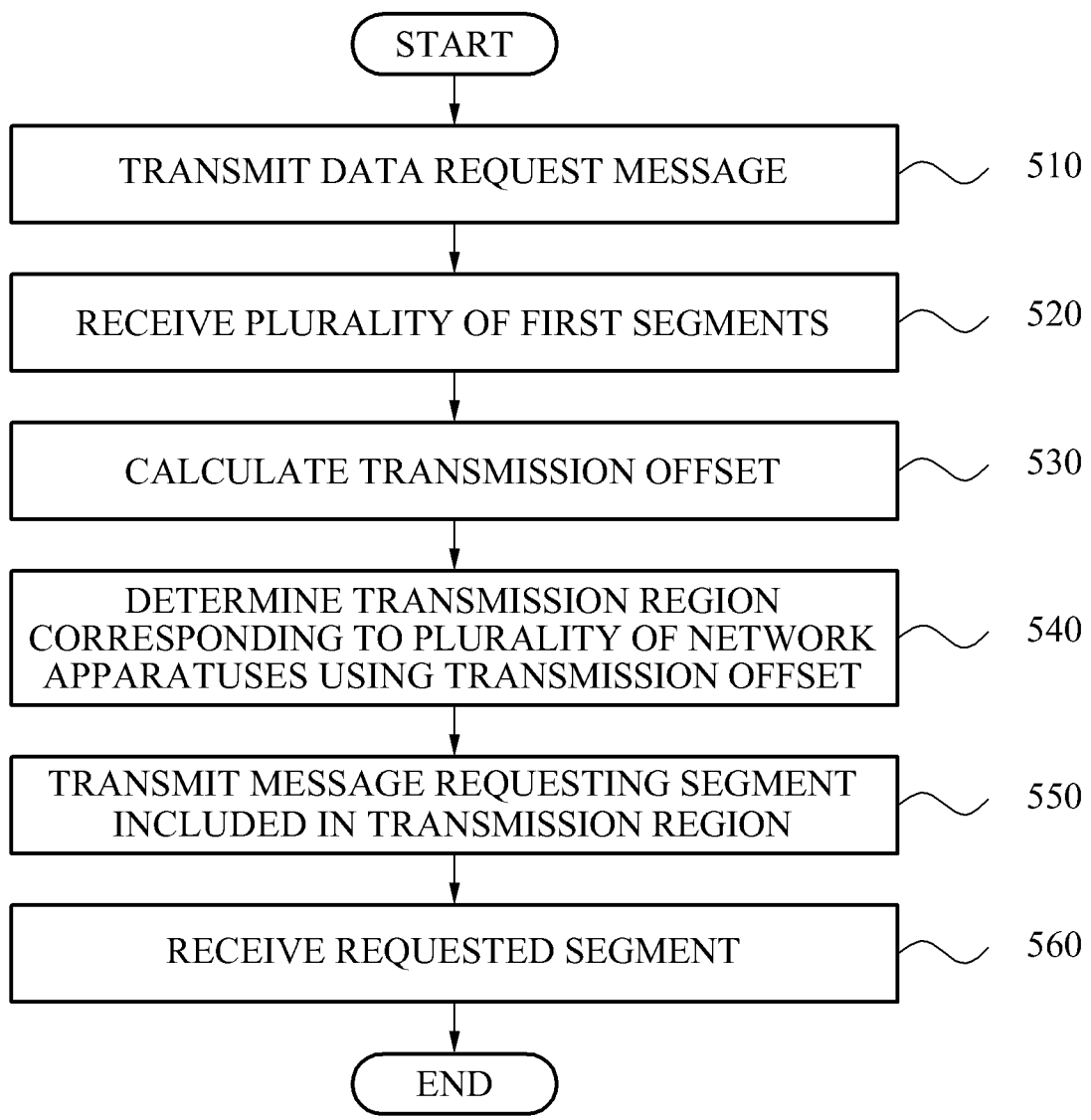
FIG. 5 is a flowchart illustrating an example method of requesting data in a network apparatus.

FIG. 5 is a flowchart illustrating an example method of requesting data in a network apparatus.

Referring to FIG. 5, in operation 510, the transceiving unit 110 may broadcast, to a plurality of terminals 210 to 206, a message requesting data.

In operation 520, the transceiving unit 110 may receive a first segment from each of the plurality of terminals 201 to 205. For example, the first segment may correspond to a first segment from a plurality of segments included in the requested data of operation 510. In one example, the first segment may be used for information signifying whether the requested data is stored in the plurality of the terminals 210 to 206.

In operation 530, the calculation unit 130 may count a number of terminals transmitting the first segment to calculate the transmission offset. In one example, the calculation unit 130 may calculate the transmission offset using a number of the counted terminals, an amount of the requested data, a size of a segment included in the requested data, and a link state of the counted terminals.

For example, as illustrated in FIG. 3, the calculation unit 130 may identically calculate, as "4", the transmission offset of each of the terminals 210 to 205 transmitting the first segment having been received during a predetermined latency time.

Also, when receiving the first segment from each of the terminals 210 to 204 during the latency time, the calculation unit 130 may adaptively calculate the transmission offset of each of the terminals 201 to 205, as illustrated in FIG. 4, in such a manner as to be different for each of the terminals 201 to 205.

In operation 540, the transmission region determining unit 130 may determine the transmission region corresponding to each of the counted terminals 201 to 205 using the calculated transmission offset. In one example, the determined transmission region of each of the terminals 201 to 205 may include a start segment corresponding to each of the terminals 201 to 205. For example, a process of determining the transmission region may be performed in the same manner as that performed by the transmission region determining unit 130 of FIG. 2, and thus further description will be herein omitted.

In operation 550, the transceiving unit 110 may transmit, to a corresponding terminal, a message requesting a segment corresponding to the start segment included in the transmission region.

For example, referring to FIG. 3, the transceiving unit 110 may transmit a message requesting the second segment to the terminal 201, transmit a message requesting the sixth segment to the terminal 202, transmit a message requesting the tenth segment to the terminal 203, transmit a message requesting the fourteenth segment to the terminal 204, and transmit a message requesting the eighteenth segment to the terminal 205, respectively.

In operation 560, the transceiving unit 110 may receive the requested segment from each corresponding terminal 201 to 205.

Figure 6:
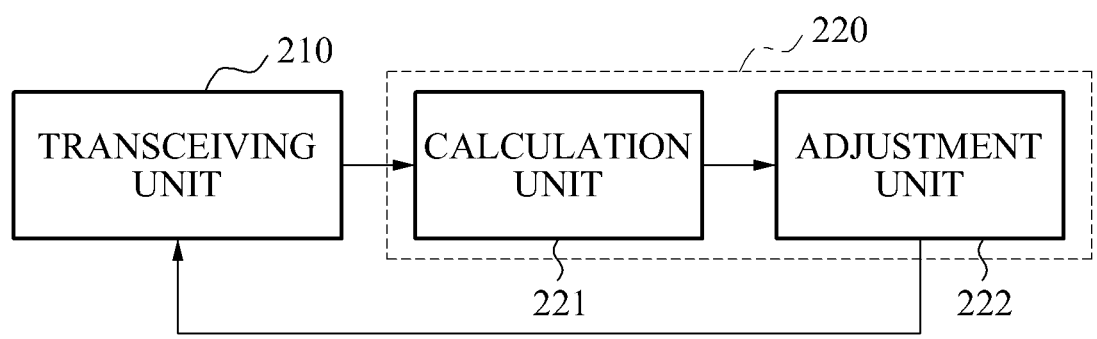
FIG. 6 is a diagram illustrating an example of a configuration of a terminal at which a data request message is received.

FIG. 6 is a diagram illustrating an example of a configuration of a terminal 200 at which a data request message is received.

Referring to FIG. 6, the terminal 200 includes a transceiving unit 210 and a determination unit 220. For example, the terminal 200 may be one from the plurality of terminals 201 to 206. For convenience of description, an example in which a transmission region of the terminal 201 is determined will be described in detail.

The transceiving unit 210 may receive a data request message from a network apparatus 10.

The determination unit 220 may determine, in response to sensing the plurality of terminals 202 to 205 in which data included in the received data request message is stored, the start segment corresponding to each of the plurality of terminals 202 to 205 based on an amount of the requested data, and a size of a segment included in the requested data. The determination unit 220 may include a calculation unit 221 and an adjustment unit 222.

For example, in response to receiving the data request message, the transceiving unit 210 may broadcast, to the plurality of terminals 202 to 206, a message requesting a first segment to search for the requested data.

The calculation unit 221 may count a number of the terminals 202 to 205 corresponding to the first segment having been received during a predetermined latency time. In one example, the calculation unit 221 may sense the terminals 202 to 205 in which the requested data is stored, by receiving the first segment having been received using the transceiving unit 210.

The calculation unit 221 may randomly calculate the start segment corresponding to the counted terminals 202 to 205 based on an amount of data requested by the network apparatus 100 and a size of a segment included in the requested data.

For example, the calculation unit 221 may calculate the start segment corresponding to the counted terminals 202 to 205 using a ratio between the amount of the requested data and a size of a segment included in the requested data. For example, the size of the segment may be a number of segments desired to be received from the terminal that requests data.

Start segment=Random[Min,Max], Min=1

Max=data size/segment size            [Equation 1]

Also, the calculation unit 221 may calculate an average transmission region using each of the calculated start segments.

For example, when the first segment is received from the terminals 202, 203, 204, and 205 in the stated order of the terminals 202 to 205, and the start segment of each of the terminals 202 to 205 is calculated as "2", "7", "11", and "18", the calculation unit 221 may calculate the average transmission region by adding-up each difference between the start segments.

For example, the calculation unit 221 may calculate a difference between the start segments of the terminals 202 and 203 as "5", calculate a difference between the start segments of the terminals 203 and 204 as "4", and calculate a difference between the start segments of the terminals 204 and 205 as "7". The calculation unit 221 may calculate a sum of the calculated differences (5+4+7=16). The calculation unit 221 may calculate the average transmission region as "5.33" by dividing "16" being the sum of the calculated differences by "3". In one example, "3" may be obtained by deducting "1" from "4" being a number of the counted terminals.

The adjustment unit 222 may adjust the start segment corresponding to the counted terminals 202 to 205 by comparing the calculated differences between the start segments with the calculated average transmission region.

For example, as illustrated in FIG. 7, when a difference of "4" between the terminals 202 and 205 is less than "5.33" of the average transmission region, the adjustment unit 222 may adjust the start segment of the terminal 202 to be positioned in a fifth segment or in a sixth segment preceding a seventh segment corresponding to the start segment of the terminal 203. In one example, the adjustment unit 222 may adjust the start segment of the terminal 203 to be positioned in a twelfth segment or in a thirteenth segment following an eleventh segment corresponding to the start segment of the terminal 204.

For example, as illustrated in FIG. 7, when the difference of "7" between the terminals 203 and 204 is greater than "5.33" of the average transmission region, the adjustment unit 222 may adjust the start segment of the terminal 204 to be positioned in a sixteenth segment or in a seventeenth segment preceding an eighteenth segment corresponding to the start segment of the terminal 205.

The transceiving unit 210 may transmit, to each corresponding terminal 202 to 205, a message requesting each of the adjusted start segments.

In one example, when the message requesting the start segment is initially transmitted, the transceiving unit 210 may transmit, to each corresponding terminal 202 to 205, the message requesting the start segment by inserting information about a size of a segment into the message.

With reference to FIG. 6, a method of determining the start segment when complete data requested by the network apparatus 100 is stored in the plurality of terminals 202 to 205 is described in detail, however, the terminal 200 may determine the start segment corresponding to each of the terminals 202 to 205, respectively, even when a part of the requested data is stored in the plurality of terminals 202 to 205.

For example, the terminal 202 from the plurality of terminals 202 to 205 may apply, when downloading the data requested by the network apparatus 100, a download region to the first segment to transmit the first segment to the terminal 200. Next, the determination unit 220 may determine the start segment corresponding to each of the counted terminals 202 to 205 using the download region corresponding to the terminal 202.

In one example, when the terminal 201 that determines the start segment downloads data, the determination unit 220 may apply the download region to the message requesting the start segment to transmit the message. Next, the plurality of terminals 202 to 205 may transmit the requested segment to the terminal 201 that transmits the message requesting the start segment, based on the applied download region.

For example, when the start segment is included in the applied download region, the plurality of terminals 202 to 205 may transmit, to the terminal 201, segments following the download region. In one example, when the start segment is not included in the applied download region, the plurality of terminals 202 to 205 may transmit, to the terminal 201, the requested segment.

Figure 8:
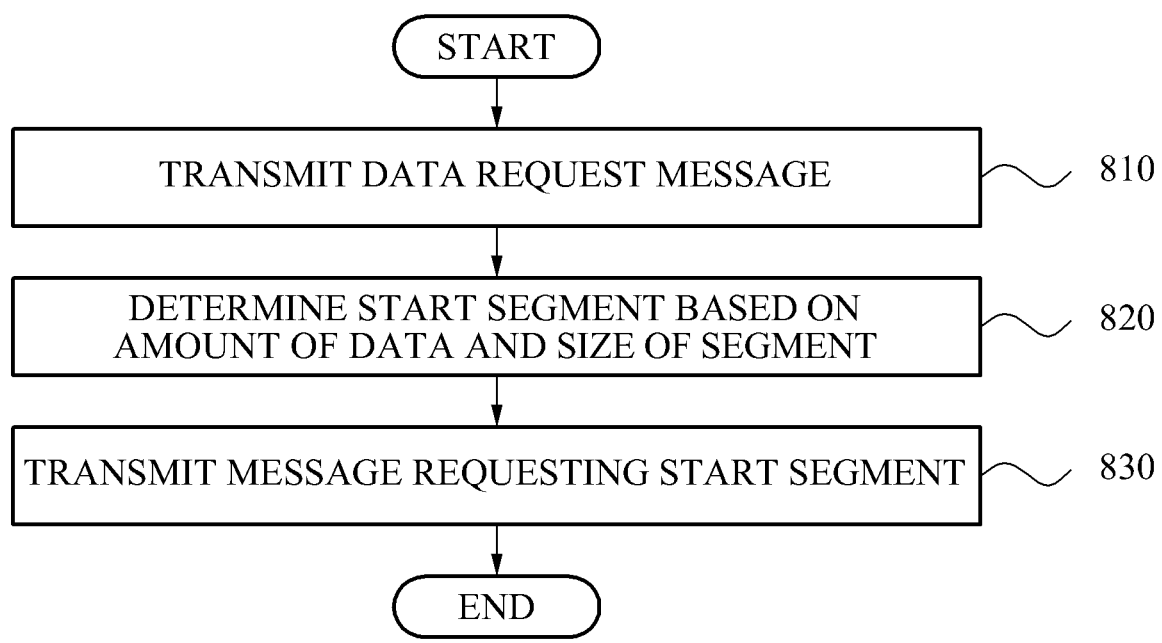
FIG. 8 is a flowchart illustrating an example method of operating a terminal at which a data request message is received.

FIG. 8 is a flowchart illustrating an example method of operating a terminal at which a data request message is received.

Referring to FIG. 8, in operation 810, the transceiving unit 210 may receive a data request message transmitted from the network apparatus 100.

In operation 820, the determination unit 220 may determine, when sensing terminals 202 to 205 in which data requested by the network apparatus 100 is stored, a start segment corresponding to each of the terminals 202 to 205 based on an amount of the requested data and a size of a segment included in the requested data. For example, the requested data may be comprised of a plurality of segments.

In one example, in operation 820, the start segment corresponding to each of the terminals 202 to 205 may be randomly determined using a ratio between an amount of the requested data and a size of a segment included in the requested data.

In operation 830, the transceiving unit 210 may transmit, to each of the terminals 202 to 205, a message requesting the determined start segment.

In one example, the determination unit 220 may adjust the start segment corresponding to each of the terminals 202 to 205.

For example, the calculation unit 221 may calculate an average transmission region using the start segment corresponding to each of the plurality of terminals 202 to 205. The adjustment unit 222 may adjust the start segment corresponding to each of the terminals 202 to 205 by comparing a difference between the start segments, corresponding to each of the terminals 202 to 205, with the average transmission region.

Next, the transceiving unit 210 may transmit, to each corresponding terminal 202 to 205, a message requesting the adjusted start segment. In one example, information about a size of a segment may be included in the message requesting the start segment to be transmitted.

As described above, in the network system based on the content name, mutually different segments from among the plurality of segments included in the data may be respectively received from the plurality of terminals, and a shared time of the data may be reduced, and a waste of radio resources may be reduced.

As a non-exhaustive illustration only, the network apparatuses described herein may refer to mobile devices such as a cellular phone, a personal digital assistant (PDA), a digital camera, a portable game console, and an MP3 player, a portable/personal multimedia player (PMP), a handheld e-book, a portable tablet and/or laptop PC, a global positioning system (GPS) navigation, and devices such as a desktop PC, a high definition television (HDTV), an optical disc player, a setup box, and the like capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD-ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of requesting data based on a content name, the method comprising:
    transmitting, to network apparatuses comprising data, a data request message to retrieve the data, the data comprising segments;
    receiving, from each of the network apparatuses, a segment of the segments corresponding to the data request message;
    calculating a transmission offset or each of the network apparatuses transmitting the segment;
    determining a transmission region for each of the network apparatuses, the transmission region corresponding to a number of the segments that equals the corresponding calculated transmission offset, and the transmission region corresponding to a start segment of the segments;
    transmitting, to each of the network apparatuses, a message requesting the start segment of the corresponding transmission region; and
    receiving, from each of the network apparatuses, the requested start segment.

2. The method of claim 1, wherein:
    the transmitting of the data request message comprises broadcasting, to the network apparatuses, a message requesting a first segment of the segments; and
    the first segment is used to retrieve information about whether the data is stored in the network apparatuses.

3. The method of claim 1, wherein:
    the transmission region for each of the network apparatuses corresponds to one or more segments starting from a second segment of the segments to a final segment of the segments; and
    the determining of the transmission region comprises determining the transmission region for each of the network apparatuses transmitting the first segment.

4. The method of claim 1, wherein the calculating of the transmission offset comprises:
    adaptively calculating the transmission offset for each of the network apparatuses transmitting the first segment.

5. The method of claim 1, wherein the calculating of the transmission offset comprises:
    adaptively calculating the transmission offset based on an amount of the data and a size of each of the segments.

6. The method of claim 1, wherein the calculating of the transmission offset comprises:

counting a number of the network apparatuses transmitting the first segment; and calculating the transmission offset based on the number of the network apparatuses, or an amount of the data, or a size of each of the segments, or a link state of each of the network apparatuses transmitting the first segment, or any combination thereof.

7. The method of claim 1, wherein the transmitting of the message requesting the start segment comprises:

multicasting, to each of the network apparatuses, the message requesting the start segment of the corresponding transmission region.

8. A network apparatus based on a content name, the network apparatus comprising:

a transceiving unit configured to
transmit, to network apparatuses comprising data, a data request message to retrieve the data, the data comprising segments, and
receive, from each of the network apparatuses, a segment of the segments corresponding to the data request message;

a calculation unit configured to calculate a transmission offset for each of the network apparatuses transmitting the segment; and a transmission region determining unit configured to determine a transmission region for each of the network apparatuses, the transmission region corresponding to a number of the segments that equals the corresponding calculated transmission offset, and the transmission region corresponding to a start segment of the segments, wherein the transceiving unit is further configured to
transmit, to each of the network apparatuses, a message requesting the start segment of the corresponding transmission region, and
receive, from each of the plurality of network apparatuses, the requested start segment.

9. The network apparatus of claim 8, wherein the transceiving unit is further configured to:

broadcast, to the network apparatuses, a message requesting a first segment of the segments; and use the first segment to retrieve information about whether the data is stored in the network apparatuses.

10. The network apparatus of claim 9, wherein:

the transmission region for each of the network apparatuses corresponds to one or more segments starting from a second segment of the segments to a final segment of the segments; and the transmission region determining unit is further configured to determine the transmission region for each of the network apparatuses transmitting the first segment.

11. The network apparatus of claim 9, wherein the calculation unit is further configured to:

adaptively calculate the transmission offset for each of the network apparatuses transmitting the first segment.

12. The network apparatus of claim 8, wherein the calculation unit is further configured to:

adaptively calculate the transmission offset based on an amount of the data and a size of each of the segments.

13. The network apparatus of claim 9, wherein the calculation unit is further configured to:

count a number of the network apparatuses transmitting the first segment; and calculate the transmission offset based on the number of the network apparatuses, or an amount of the data, or a size of each of the segments, or a link state of each of the network apparatus transmitting the first segment, or any combination thereof.

14. The network apparatus of claim 8, wherein the transceiving unit is further configured to:

multicast, to each of the network apparatuses, the message requesting the start segment of the corresponding transmission region.

15. A method of requesting data based on a content name, the method comprising:

receiving a data request message requesting data comprising segments;

sensing network apparatuses storing the data;

determining an index of a start segment of the segments that corresponds to each of the sensed network apparatuses based on an amount of the data and a size of each of the segments; and transmitting, to each of the sensed network apparatuses, a message requesting the start segment corresponding to the determined index.

16. The method of claim 15, wherein:

the determining of the index of the start segment comprises
calculating an average transmission region based on the index of the start segment corresponding to each of the sensed network apparatuses; and
adjusting the index of the start segment corresponding to each of the sensed network apparatuses, in response to a difference between indices of start segments of the segments that correspond to the sensed network apparatuses, being different than the average transmission region; and the transmitting of the message comprises transmitting, to each of the sensed network apparatuses, a message requesting the start segment corresponding to the adjusted index.

17. The method of claim 15, wherein the determining of the start segment comprises:

randomly determining the index of the start segment corresponding to each of the sensed network apparatuses based on a ratio between the amount of the data and the size of each of the segments.

18. The method of claim 15, wherein the transmitting of the message comprises:

inserting information about the size of each of the segments in the message; and transmitting, to each of the sensed network apparatuses, the message in which the information is inserted.

19. A network apparatus based on a content name, the network apparatus comprising:

a transceiving unit configured to receive a data request message requesting data comprising segments; and a determination unit configured to
sense network apparatuses storing the data, and
determine an index of a start segment of the segments that corresponds to each of the sensed network apparatuses based on an amount of the data and a size of each of the segments, wherein the transceiving unit is further configured to transmit, to each of the sensed network apparatuses, a message requesting the start segment corresponding to the determined index.

20. The network apparatus of claim 19, wherein the determination unit comprises:

a calculation unit configured to calculate an average transmission region based on the index of the start segment corresponding to each of the sensed network apparatuses; and an adjustment unit configured to adjust the index of the start segment corresponding to each of the sensed network apparatuses in response to a difference between indices of start segments of the segments that correspond to the sensed network apparatuses, being different than the average transmission region, wherein the transceiving unit is further configured to transmit, to each of the sensed network apparatuses, a message requesting the start segment corresponding to the adjusted index.

21. A non-transitory computer-readable storage medium storing a program to request data based on a content name, comprising instructions to cause a computer to:

transmit, to network apparatuses comprising data, a data request message to retrieve the data, the data comprising segments;

receive, from each of the network apparatuses, a segment of the segments corresponding to the data request message;

calculate a transmission offset for each of the network apparatuses transmitting the segment;

determine a transmission region for each of the network apparatuses, the transmission region corresponding to a number of the segments that equals the corresponding calculated transmission offset, and the transmission region corresponding to a start segment of the segments;

transmit, to each of the network apparatuses, a message requesting the start segment of the corresponding transmission region; and receive, from each of the network apparatuses, the requested start segment.

22. The non-transitory computer-readable storage medium of claim 21, wherein:

the transmitting of the data request message comprises broadcasting, to the network apparatuses, a message requesting a first segment of the segments; and the first segment is used to retrieve information about whether the data is stored in the network apparatuses.

23. A non-transitory computer-readable storage medium storing a program to request data based on a content name, comprising instructions to cause a computer to:

receive a data request message requesting data comprising segments;

sense network apparatuses storing the data;

determine an index of a start segment of the segments that corresponds to each of the sensed network apparatuses based on an amount of the data and a size of each of the segments; and transmit, to each of the sensed network apparatuses, a message requesting the start segment corresponding to the determined index.

24. The method of claim 1, wherein the calculating of the transmission offset comprises:

counting a number of the network apparatuses transmitting the first segment; and calculating the transmission offset based on the number of the network apparatuses and a number of the segments.

25. The method of claim 1, wherein the determining of the transmission region comprises:

sequentially determining the transmission region for each of the network apparatuses based on a sequential order that the segment is received from each of the network apparatuses.

* * * * *